UNITED STATES PATENT OFFICE.

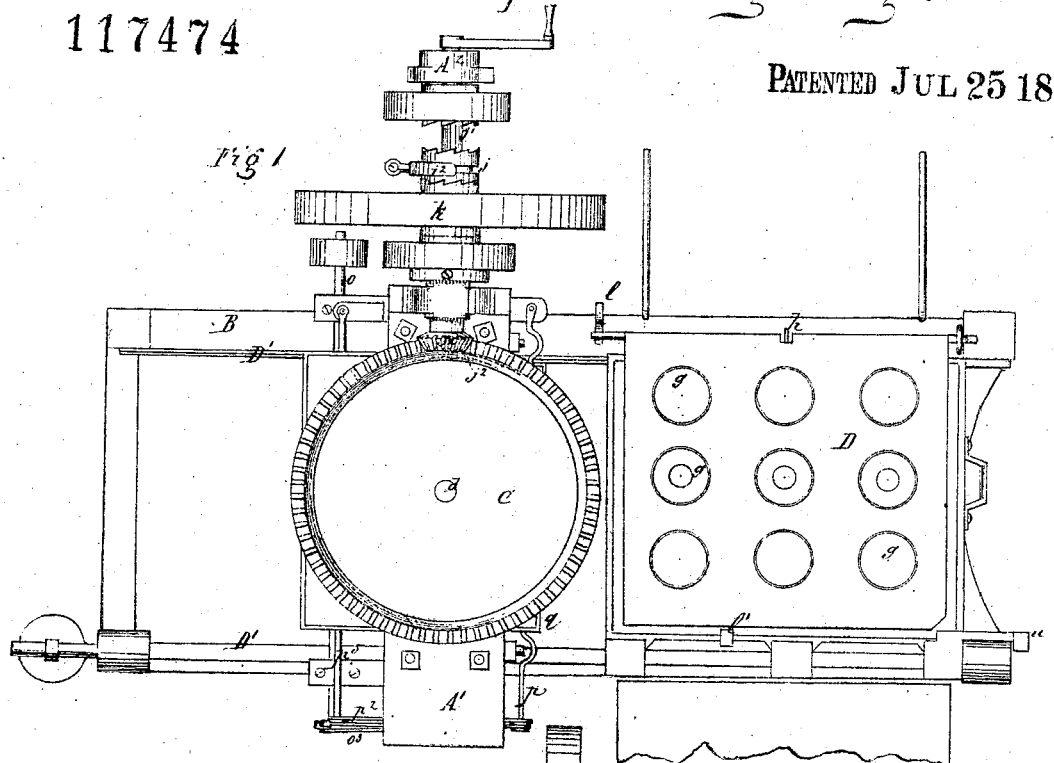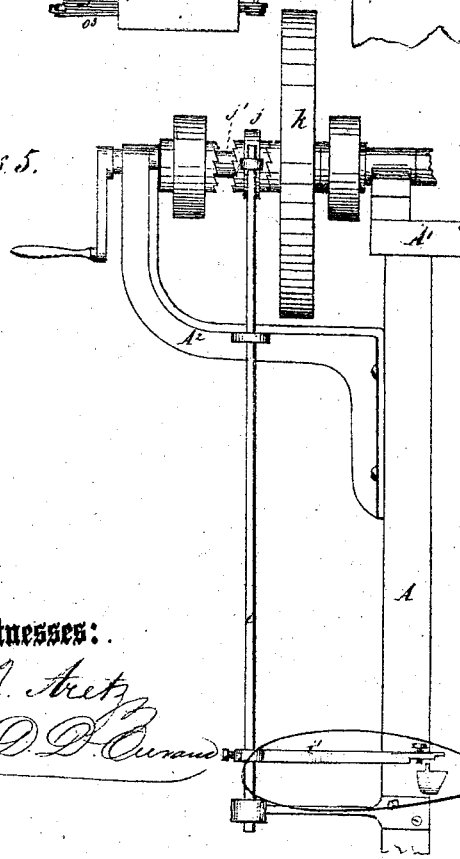

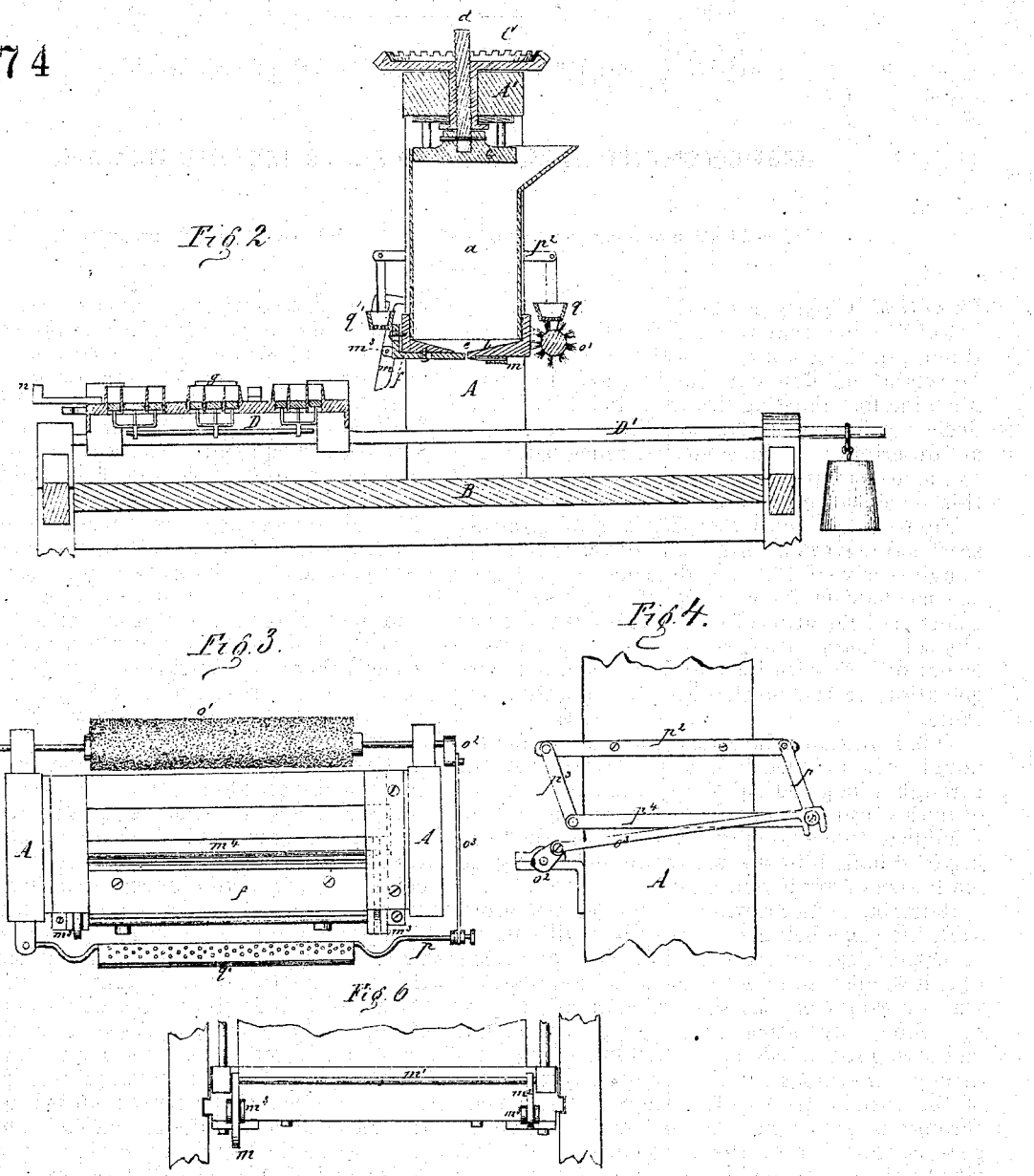

JOHN H. SHROTE, OF BALTIMORE, MARYLAND.

IMPROVEMENT IN MACHINES FOR SHEETING DOUGH.

Specification forming part of Letters Patent No. 117,474, dated July 25, 1871.

*To all whom it may concern:*

Be it known that I, JOHN H. SHROTE, of Baltimore, in the county of Baltimore and State of Maryland, have invented a new and Improved Machine for Sheeting Dough; and I do hereby declare the following to be a full, clear, and exact description of the same, reference being had to the accompanying drawing making a part of this specification, in which—

Figure 1 is a top view; Fig. 2, a longitudinal sectional elevation; Fig. 3, a bottom view of the dough-receiver; Fig. 4, a detached elevation of the mechanism for working the sieves; Fig. 5, a detached elevation of the mechanism for throwing the clutch into gear with the band-wheel or out of gear with it; and Fig. 6 is a detached elevation of the mechanism for operating the knife.

This invention relates to a machine for forcing dough, when placed in a mass in a receiver, out through a longitudinal slot in the bottom thereof in the form of a sheet by pressure applied from a follower to the dough in the receiver, the forming of dough into sheets by pressure being the main idea of my invention.

Referring to the drawing, $a$ is the receiver aforesaid, the same being an oblong box without top or bottom, set in a recessed horizontal plate $b$ that is supported at its ends in standards A A which spring from the sides of a frame, B. $c$ is the follower, the same being secured to the lower end of a threaded stem, $d$, which passes upward through the cross-bar $A^1$, connecting the tops of the standards A. The stem $d$ also passes through a tapped hole at the center of a bevel-gear, C, that rests on the cross-bar $A^1$. The longitudinal slot $e$ is made in the plate $b$ so that as the follower descends it forces a sheet of dough out through the slot. If a corrugated or serrated bar be set at the side of the slot the sheet of dough will be furrowed or fluted accordingly. An angle-bar, $f$, is attached to the front side of the plate $b$ by screws, and extends under the plate $b$ far enough to cover the slot $e$. Hence, by means of its attaching-screws the angle $f$ can be adjusted so as to practically vary the width of the slot $e$ or to close it altogether, thus regulating the thickness of the sheet. Beneath the plate $b$, between the standards A and above the frame B, are located parallel horizontal rails $D'$, on which slides a carriage, E, to the top of which is secured a number of annular cake-cutters, $g$. To one side of the carriage D a projection, $h$, is affixed, which, when the carriage has nearly reached the rear end of its throw, strikes the inner end of an arm, $i^1$, that extends from a vertical rock-shaft, $i$, which is mounted in suitable supports on one side of the adjacent standard A. A forked arm, $i^2$, projecting from the upper end of the shaft $i$, embraces a clutch, $j$, that slides on a horizontal shaft, $j^1$, one of whose bearings is on the cross-bar $A^1$ and the other in an arm, $A^2$, that extends from the adjacent standard A. The striking of the projection $h$ aforesaid against the arm $i$ throws the clutch $j$ into gear with a band-wheel, $k$, to which power is communicated *aliunde*. The wheel $k$ thereupon begins to turn the shaft $j^1$, a gear, $j^2$, on the inner end of which, engaging with the wheel C, rotates the latter. The wheel C screws the stem $d$ downward; stem $d$ carries the follower $c$ downward; and the follower causes a sheet of dough to pass through the slot $e$. The carriage D should then be drawn forward, this carriage being moved in both directions by hand. As the carriage passes under the plate $b$ it receives the sheet, the latter spreading itself flat upon the tops of the cutter $g$. A little before the rear end of the carriage passes under the plate $b$ a hook, $l$, attached to the carriage, strikes the arm $i$ and throws the clutch $j$ out of gear with the wheel $k$, thus stopping the follower. Just as the end of the carriage passes under the slot $e$ a projection, $l'$, attached to the carriage, strikes the lower end of a lever, $m$, which projects downward from a horizontal shaft, $m^1$, mounted in boxes attached to the front of the plate $b$. The lever $m$ and a similar lever, $m^2$, projecting downward from the opposite end of the shaft $m^1$, are both jointed to the outer ends of arms $m^3$, which are attached to the extremities of a knife, $m^4$, placed beneath the plate $b$. The arms $m^3$ slide in ways made for them crosswise of the plate $b$. The striking of the projection $l'$ aforesaid against the lever $m$ causes the knife $m^4$ to be drawn forward so as to sever the sheet of dough at the slot $e$. The sheet lying on the carriage is thus rendered independent, and is ready to be cut into cakes and turned over into the bake-pan by the means described in my patent dated October 11, 1859. This having been done, the carriage is run back again, the projection $h$ throws the clutch $j$ into gear with the wheel $k$ as before, and a hook, $n$, attached to the front of the carriage, striking the lever $m$, throws the knife $m^4$ backward from the slot $e$. A shaft, $o$, mounted horizontally on the back sides of the standards A, and connected by a band with the shaft $j^1$, bears a rotary brush, $o^1$. To a crank, $o^2$, on the end of the shaft $o$ is jointed a pitman, $o^3$, whose other extremity is connected with the end of a rod, $p$, the other end of which is pivoted to a lug extending forward from one end of the standards A. The extremity of the rod $p$, to which the pitman $o^3$ is attached, is supported by a link, $p^1$, suspended from a horizontal bar, $p^2$, that is fastened to the outside of one of the standards A. A similar link, $p^3$, is suspended to the other end of the bar $p^2$, and the lower extremities of the links $p^1 p^3$ are connected by a bar, $p^4$, placed parallel to the bar $p^2$. The link $p^3$ supports the outer end of a rod, $p^5$, whose other extremity is pivoted to a lug extending backward from the opposite side of the same standard A to which the lug of the rod $p$ is attached. The rods $p$ $p^5$ bear sieves $q$ $q'$, the former being situated directly over the brush $o^1$, which sieves are vibrated from the shaft $o$ through the medium of the pitman $o^3$, links $p^1 p^3$, and connecting-bar $p^4$. The sieve $q$ sifts flour upon the brush $o^1$, and the brush throws the flour under the plate $b$ and upon that surface of the sheet of dough which is laid directly upon the cutters $g$. The sieve $q'$ sifts flour upon that side of the sheet which is uppermost on the carriage D. The object of sifting the flour upon the sheet is to prevent the dough from sticking to the cutters and pans. When the carriage dumps the sheet into the baker that side which was beneath while on the carriage becomes uppermost in the baker.

Having thus described my invention, what I claim as new, and desire to secure by Letters Patent, is—

1. The combination of the receiver $a$, follower $c$, plate $b$ provided with the slot $e$, and adjustable angle-bar $f$, as shown and described, whereby the dough is pressed out in sheets and their thickness simultaneously regulated, as specified.

2. The brush $o^1$, arranged on the shaft $o$ to operate in combination with the sieve $q$ and the other devices of the fifth clause of claim, substantially as specified.

3. The combination of the plate $b$, knife $m^4$, arms $m^3$, rod $m^1$, and levers $m$ $m^2$ with the carriage D, as set forth.

4. The combination of the arms $i$ $i^2$, rock-shaft $i^1$, and clutch $j$ with the carriage, as explained.

5. The sieves $q$ $q'$, shaft $o$, pitman $o^3$, rods $p$ $p^5$, links $p^1 p^3$, connecting-bar $p^4$, and stationary bar $p^2$, combined, as specified.

The above specification of my invention signed by me this 1st day of June, A. D. 1871.

JOHN H. SHROTE.

Witnesses:
SOLON C. KEMON,
THOS. D. D. OURAND.